US009823639B2

United States Patent
Anzai et al.

(10) Patent No.: US 9,823,639 B2
(45) Date of Patent: Nov. 21, 2017

(54) CONTROL PROGRAM MANAGEMENT SYSTEM AND METHOD FOR CHANGING CONTROL PROGRAM

(71) Applicant: MITSUBISHI HEAVY INDUSTRIES, LTD., Tokyo (JP)

(72) Inventors: Fumikado Anzai, Tokyo (JP); Yoshikane Yamanaka, Tokyo (JP); Kenichi Morimoto, Tokyo (JP)

(73) Assignee: MITSUBISHI HEAVY INDUSTRIES, LTD., Tokyo (JP)

( * ) Notice: Subject to any disclaimer, the term of this patent is extended or adjusted under 35 U.S.C. 154(b) by 909 days.

(21) Appl. No.: 13/773,266

(22) Filed: Feb. 21, 2013

(65) Prior Publication Data

US 2013/0245792 A1 Sep. 19, 2013

(30) Foreign Application Priority Data

Feb. 27, 2012 (JP) .................................. 2012-039997

(51) Int. Cl.
*G05B 19/042* (2006.01)
*G06F 21/50* (2013.01)
(Continued)

(52) U.S. Cl.
CPC ......... *G05B 19/0426* (2013.01); *G06F 21/50* (2013.01); *H04L 41/0866* (2013.01);
(Continued)

(58) Field of Classification Search
CPC . H04L 41/0869; H04L 41/0873; H04L 67/34; H04L 41/0866; G05B 19/0426;
(Continued)

(56) References Cited

U.S. PATENT DOCUMENTS 6,584,499 B1   6/2003 Jantz et al.
6,928,328 B2 *  8/2005 Deitz ..................... G06F 21/64
                                                  700/86

(Continued)

FOREIGN PATENT DOCUMENTS

CN   101861553 A   10/2010
EP      1703667 A1   9/2006
(Continued)

OTHER PUBLICATIONS (Machine translation of EP20050005589).*
(Continued)

*Primary Examiner* — Ryan Jarrett
(74) *Attorney, Agent, or Firm* — Westerman, Hattori, Daniels & Adrian, LLP

(57) ABSTRACT

A control arithmetic device controls so that an approval-receiving device displays a content of a new control program that the control arithmetic device received from the editing device. The approval-receiving device receives input of approval information that indicates whether a change of a control program is approved or not from a manager. The control arithmetic device changes the control program to the new control program in the case where the approval information received from the approval-receiving device indicates approval of the control program.

12 Claims, 7 Drawing Sheets

(51) Int. Cl.
*H04L 12/24* (2006.01)
*H04L 29/08* (2006.01)

(52) U.S. Cl.
CPC .......... *H04L 41/0883* (2013.01); *H04L 41/28* (2013.01); *H04L 67/34* (2013.01); *Y04S 40/162* (2013.01)

(58) Field of Classification Search
CPC ...... G05B 19/048; G05B 9/02; G05B 19/042; G06F 21/50; G06F 11/00
USPC ...................................................... 700/79, 87
See application file for complete search history.

(56) References Cited

U.S. PATENT DOCUMENTS

| | | | |
|---|---|---|---|
| 2005/0138605 A1* | 6/2005 | Yamamoto | G06F 11/3672 700/79 |
| 2006/0218545 A1* | 9/2006 | Taguchi | G06F 8/67 717/168 |
| 2009/0106590 A1* | 4/2009 | Miller | G05B 19/056 714/28 |
| 2009/0113272 A1* | 4/2009 | Tan | G06F 11/1052 714/765 |
| 2009/0249065 A1* | 10/2009 | De Atley | G06F 21/51 713/164 |
| 2010/0063605 A1 | 3/2010 | Drebinger et al. | |
| 2010/0242033 A1* | 9/2010 | Fritsch | G06F 8/65 717/171 |
| 2011/0125798 A1* | 5/2011 | Misch | G06F 8/71 707/785 |
| 2015/0271161 A1* | 9/2015 | Katsuta | H04L 63/06 713/171 |

FOREIGN PATENT DOCUMENTS

| | | |
|---|---|---|
| EP | 1916583 A1 | 4/2008 |
| JP | 07-099674 A | 4/1995 |
| JP | 09-198266 A | 7/1997 |
| JP | 11-110197 A | 4/1999 |
| JP | 3224970 B2 | 11/2001 |
| JP | 2002-063045 A | 2/2002 |
| JP | 2003-039359 A | 2/2003 |
| JP | 2005-535945 A | 11/2005 |
| JP | 2007-058368 A | 3/2007 |
| JP | 2008-152446 A | 7/2008 |
| JP | 2009-086964 A | 4/2009 |
| JP | 2010-507848 A | 3/2010 |
| JP | 2010-287127 A | 12/2010 |
| JP | 2011-501294 A | 1/2011 |
| JP | 2012-008872 A | 1/2012 |
| JP | 2012-150686 A | 8/2012 |
| WO | 03/081397 A2 | 10/2003 |
| WO | 2008/049727 A1 | 5/2008 |

OTHER PUBLICATIONS

European Search Report dated Oct. 7, 2015, issued in counterpart EP application No. 13755169.3. (8 pages).
Office Action dated Nov. 26, 2015, issued in counterpart Chinese Application No. 201380004412.6, w/English ranslation (14 pages).
Notice of Allowance dated May 31, 2016, issued in counterpart Japanese Patent Application No. 2012-039997, with English translation. (6 pages).
International Search Report of PCT/JP2013/054227, dated Apr. 16, 2013, w/English translation.
Written Opinion of PCT/JP2013/054227, dated Apr. 16, 2013, w/English translation.

* cited by examiner

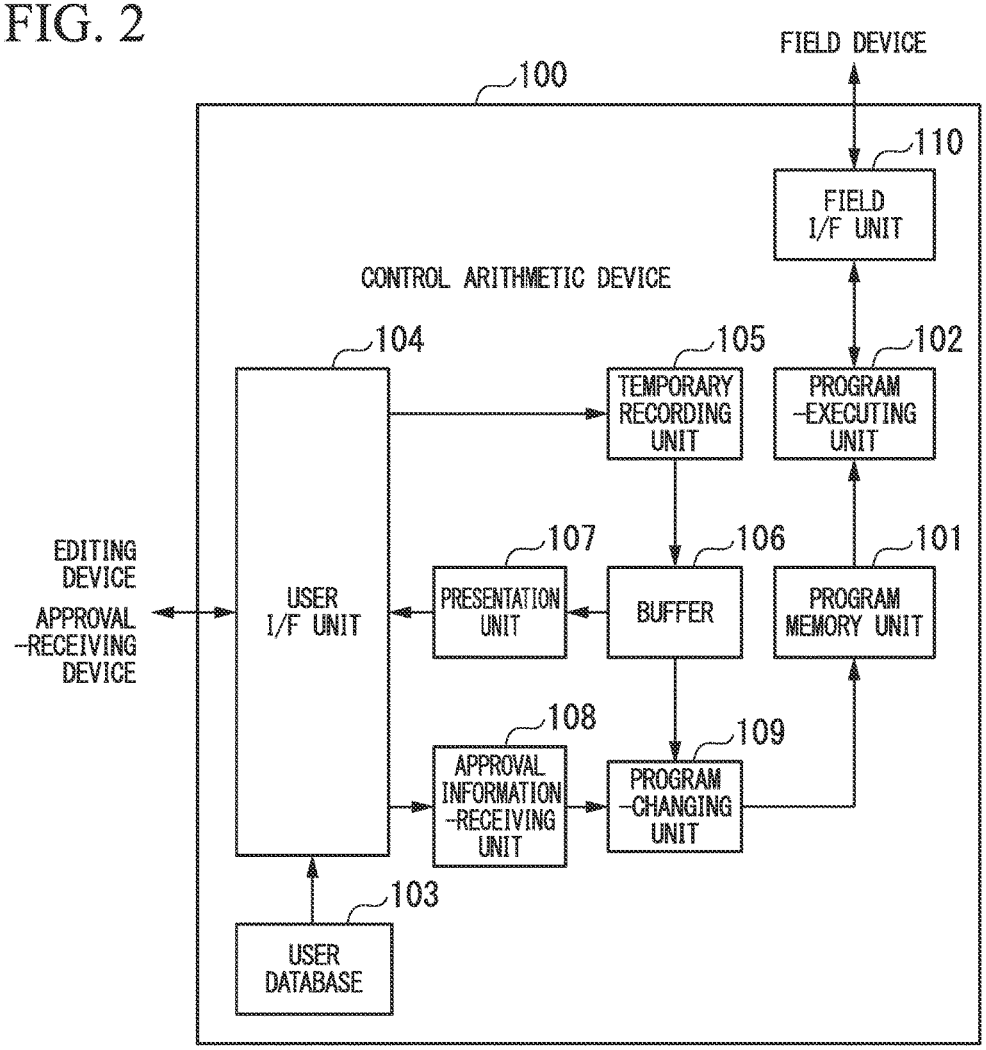

US 9,823,639 B2

CONTROL PROGRAM MANAGEMENT SYSTEM AND METHOD FOR CHANGING CONTROL PROGRAM

TECHNICAL FIELD

The present invention relates to a control program management system that manages a change of a control program executed by a control arithmetic device and a changing method of the control program executed by the control arithmetic device.

Priority is claimed on Japanese Patent Application No. 2012-039997, filed on Feb. 27, 2012, the content of which is incorporated herein by reference in its entirety.

BACKGROUND ART

In a power generation plant, operators or maintenance engineers need to be able to change a control parameter or logic of a control program during operation of a control arithmetic device that executes the control program in the power generation plant. The control parameter or logic is changed by a terminal in a central control room (an operator station or an engineering station). Therefore, a method of changing a configuration file or a control program online has been developed (refer to Patent Documents 1 and 2).

At this time, in order to prevent the plant from becoming unstable by setting the parameter of the control program to an incorrect value or changing to an incomplete logic by the operators or the maintenance engineers, such a change is preferably checked before changing. As a method of preventing such misoperations, a method of checking a version of the program (refer to Patent Document 3) and a method of checking whether a person has the authority to edit the program or not (refer to Patent Document 3) have been disclosed.

Further, an international functional safety standard (IEC (International Electrotechnical Commission) 61508 and JIS (Japanese Industrial Standards) C 0508) recommends that means for preventing misoperation in order that the operators do not change to the incorrect control program be adopted.

CITATION LIST

Patent Document

Patent Document 1: Japanese Translation of PCT International Application No. 2010-507848
Patent Document 2: Japanese Published Patent Application No. H7-99674
Patent Document 3: Japanese Published Patent Application No. H11-110197
Patent Document 4: Japanese Translation of PCT International Application No. 2005-535945

SUMMARY OF INVENTION

Problem to be Solved by the Invention

However, even if the methods disclosed in Patent Documents 3 and 4 are adopted, there is a problem in that a change to a control parameter or logic that includes a content error therein cannot be prevented. Further, there is a problem that the methods disclosed in Patent Documents 3 and 4 do not realize the means for preventing misoperation demanded by IEC 61508 and JIS C 0508.

An object of the present invention is to provide a control program management system that prevents a content of a control program from being changed to a control parameter or logic that includes an error and a method of changing the control program.

Means for Solving the Problem

An aspect of the present invention is established in order to solve the above-described problem. According to the aspect of the present invention, a control program management system includes: a control arithmetic device; an editing device that generates a new control program to be executed by the control arithmetic device instead of a control program being executed by the control arithmetic device and transmits the new control program to the control arithmetic device; and an approval-receiving device that receives an input of approval information indicating whether the new control program generated by the editing device be executed by the control arithmetic device or not and transmits the approval information to the control arithmetic device. The control program management system manages the change of the control program executed by the control arithmetic device. The control arithmetic device includes: a program memory unit that stores the control program to be executed; a program execution unit that executes the control program stored in the program memory unit; a temporary recording unit that receives the new control program from the editing device and records the control program in a buffer; a presentation unit that controls so that the approval-receiving device displays a content of the control program recorded in the buffer; an approval information-receiving unit that receives the approval information from the approval-receiving device; and a program-changing unit that rewrites the control program stored in the program memory unit to the control program recorded in the buffer when the approval information received by the approval information-receiving unit indicates approval of the control program.

According to the aspect of the present invention, the control program management system may further include: a user database that links and stores identification information that identifies a user, approval information used for approval of the ID, and authority of the user for each user. The editing device may transmit the identification information and the approval information of the user who generates the new control program to the control arithmetic device in addition to the new control program. The approval receiving device may transmit the identification information and the approval information of the user who inputs the approval information to the control arithmetic device in addition to the approval information. The program-changing unit of the control arithmetic device may rewrite the control program stored in the program memory unit to the control program stored in the buffer when the approval information received by the approval information-receiving unit indicates the approval of the control program in the case where the authority that is linked to the identification information and the approval information received from the editing device and is stored in the user database is authority allowed to edit the control program and the authority that is linked to the identification information and the approval information received from the approval-receiving device and is stored in the user database is authority allowed to approve the control program.

According to the aspect of the present invention, the editing device may transmit a first error detection code generated using the new control program and a second error detection code generated using bit-inverted information of the new control program being attached to the new control program. The program-changing unit of the control arithmetic device may rewrite the control program stored in the program memory unit to the control program stored in the buffer when the approval information received by the approval information-receiving unit indicates the approval of the control program in the case where an error is not detected by using the first error detection code and the second error detection code received from the editing device being attached to the control program.

According to the aspect of the present invention, the presentation unit of the control arithmetic device may simulate an execution of the control program stored in the buffer and control so that the approval-receiving device displays the result of the simulation.

According to the aspect of the present invention, the presentation unit of the control arithmetic device may control so that the approval-receiving device displays a difference between the control program being executed by the program-executing unit and the control program stored in the buffer.

According to the aspect of the present invention, the control program management system may further include a program repository device that stores each control program that was stored in the program memory unit before. The presentation unit of the control arithmetic device may control so that the approval-receiving device displays a difference between each control program stored in the program repository device and the control program stored in the buffer.

According to the aspect of the present invention, the editing device may includes: a check-out unit that checks out the control program being executed by the program-executing unit from the program repository device and locks so that the control program cannot be edited; an editing unit that generates the new control program by editing the checked-out control program; a transmitting unit that transmits the new control program generated by the editing unit to the control arithmetic device; and a check-in unit that unlocks the checked-out control program and checks in the new control program to the program repository device. The program repository device may determine whether a user who locks the control program is the same as a user who unlocks or not and notify the determination result to a user who has approval authority when the user who locks the control program is not the same as the user who unlocks.

According to the aspect of the present invention, the editing device may include: a check-out unit that checks out the control program being executed by the program-executing unit from the program repository device and locks so that the control program cannot be edited; an editing unit that generates the new control program by editing the checked-out control program; and a transmitting unit that transmits the new control program generated by the editing unit to the control arithmetic device. The lock of the control program stored in the program repository device may be unlocked after the approval-receiving device receives the approval information.

According to the aspect of the present invention, the approval-receiving device may unlock the control program stored in the program repository device in the case of receiving the approval information.

According to the aspect of the present invention, the approval-receiving device may transmit a notification to the editing device when the approval-receiving device receives the approval information. The editing device may unlock the control program stored in the program repository device when the editing device receives the notification from the approval-receiving device.

According to the aspect of the present invention, the control arithmetic device may have a plurality of the control arithmetic devices which execute the same control program due to its redundancy. The approval-receiving device may transmit the approval information to the editing device instead of the control arithmetic device. The editing device may transmit the new control program to all the control arithmetic devices to which the new control program is applied and transfer the approval information received from the approval-receiving device to the control arithmetic device. The approval information-receiving unit of the control arithmetic device may receive the approval information from the editing device instead of the approval-receiving device.

Another aspect of the present invention includes a method of changing a control program executed by a control arithmetic device, the method including: generating, by an editing device, a new control program to be executed by the control arithmetic device instead of a control program being executed by the control arithmetic device and transmitting the new control program to the control arithmetic device; receiving the new control program from the editing device by a temporary recording unit of the control arithmetic device and recording the control program in a buffer; displaying a content of the control program recorded in the buffer on an approval-receiving device by a presentation unit of the control arithmetic device; receiving, by the approval-receiving device, an input of approval information that indicates whether the new control program generated by the editing device be executed by the control arithmetic device or not and transmitting the approval information to the control arithmetic device by the approval-receiving device; receiving the approval information from the approval-receiving device by an approval information-receiving unit of the control arithmetic device; and rewriting, by a program-changing unit of the control arithmetic device, the control program stored in a program memory unit that stores the control program to be performed to the control program recorded in the buffer when the approval information received by the approval information-receiving unit indicates an approval of the control program.

Effects of Invention

According to the aspects of the present invention, the control arithmetic device controls so that the approval-receiving device displays a content of the new control program generated by the editing device. By doing this, the control arithmetic device makes a third person other than the operators and maintenance engineers confirm the content of the new control program. Then, the control arithmetic device sets the new control program as the control program to be executed when the control arithmetic device receives the approval information that indicates approval of the third person from the approval-receiving device. Accordingly, the control program management system can prevent the content of the control program from being changed to the control parameter or logic that includes the error.

BRIEF DESCRIPTION OF DRAWINGS

FIG. 2 is a schematic block diagram illustrating a configuration of a control arithmetic device according to the first embodiment of the present invention.

FIG. 3 is a diagram illustrating an example of information stored in a user database.

DESCRIPTION OF EMBODIMENTS

[First Embodiment]

Hereinafter, an embodiment of the present invention will be described in details with reference to the drawings.

Figure 1:
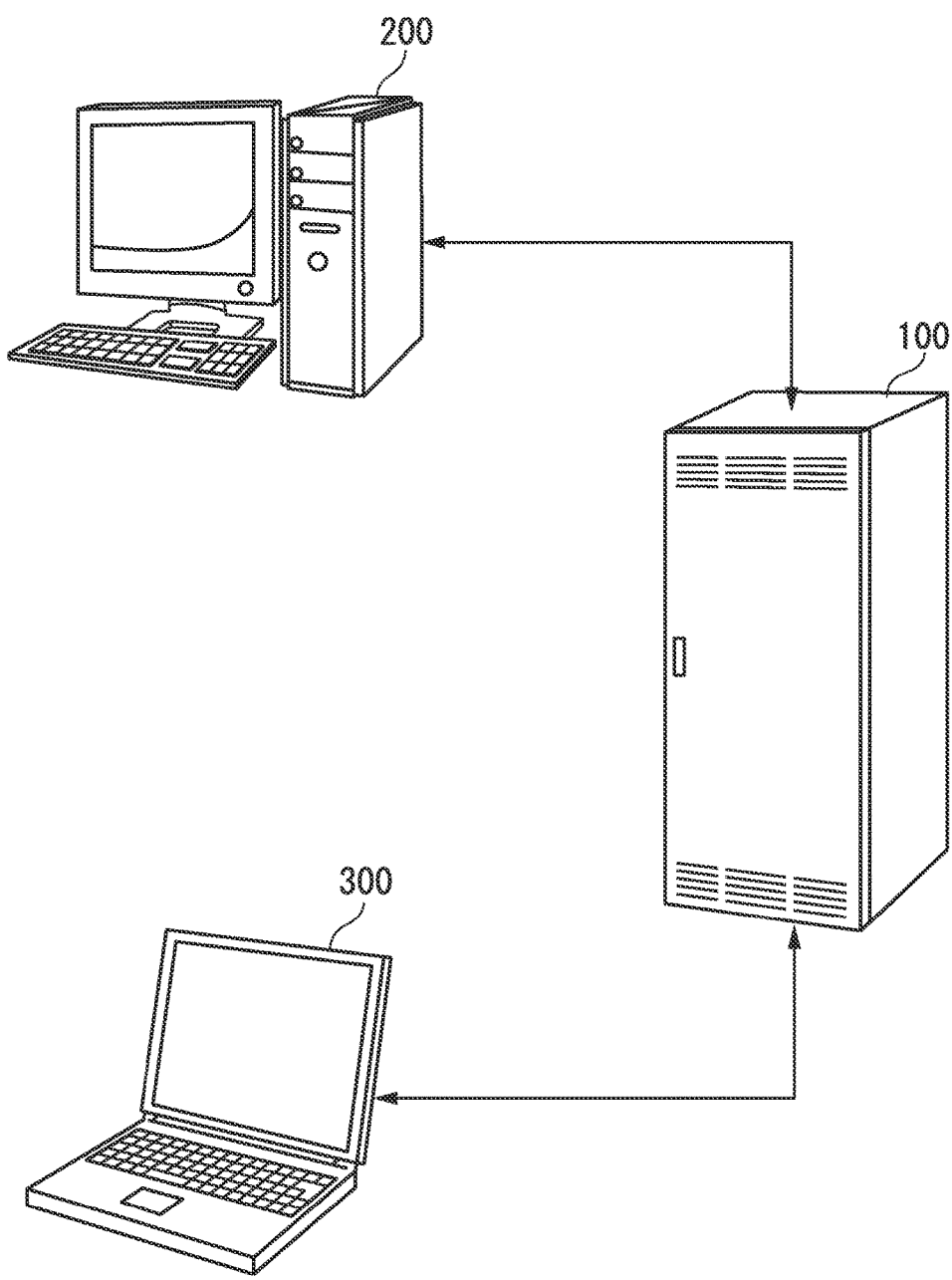
FIG. 1 is a diagram illustrating a configuration of a control program management system according to a first embodiment of the present invention.

FIG. 1 is a diagram illustrating a configuration of a control program management system according to a first embodiment of the present invention.

The control program management system includes a control arithmetic device 100, an editing device 200, and an approval-receiving device 300.

The control arithmetic device 100 operates a plant by executing a control program.

The editing device 200 is mounted on a terminal in a central control room (an operator station or an engineering station). The editing device 200 edits the control program executed by the control arithmetic device 100.

The editing device 200 is operated by an operator or a maintenance engineer (a user).

The approval-receiving device 300 receives approval for operating the control arithmetic device 100 by the control program generated by the editing device 200 from a manager (a user). The approval-receiving device 300 transmits, to the control arithmetic device 100, approval information indicating whether operating the control arithmetic device 100 by the control program generated by the editing device 200 is approved or not. Here, the manager is a third person other than the operator and the maintenance engineer.

FIG. 2 is a schematic block diagram illustrating a configuration of the control arithmetic device 100 according to the first embodiment of the present invention.

The control arithmetic device 100 includes a program memory unit 101, a program-executing unit 102, a user database 103, a user I/F unit 104, a temporarily recording unit 105, a buffer 106, a presentation unit 107, an approval information-receiving unit 108, a program-changing unit 109, and a field I/F unit 110.

The program memory unit 101 stores the control program to be executed for controlling the plant.

The program-executing unit 102 executes the control program stored in the program memory unit 101 and controls a field device such as a turbine and a boiler via the plant I/F unit 110.

The user database 103 stores information of the users (the operator, the maintenance engineer, the manager, and the like) of the control program management system.

When the user I/F unit 104 communicates with the editing device 200 and the approval-receiving device 300, the user I/F unit 104 collates information of a user of the user I/F unit 104 and the information stored in the user database 103. In the case where the user of the user I/F unit 104 can be confirmed to be a proper user, the user I/F unit 104 communicates with the editing device 200 and the approval-receiving device 300.

The temporary recording unit 105 receives a new control program generated by the editing device 200 and records the new control program in the buffer 106.

The buffer 106 temporality stores the new control program generated by the editing device 200.

The presentation unit 107 controls so that the approval-receiving device 300 displays a content of the new control program stored in the buffer 106.

The approval information-receiving unit 108 receives an input of the approval information from the approval-receiving device 300.

The program-changing unit 109 determines whether the control program stored in the buffer be recorded in the program memory unit 101 or not based on the approval information.

The field I/F unit 110 communicates between the field device and the program-executing unit.

Next, information stored in the user database 103 will be described.

FIG. 3 is a diagram illustrating an example of information stored in the user database 103.

As illustrated in FIG. 3, the user database 103 links and stores an ID (identification information) for identifying the user, a password (approval information) used for approval of the ID, and authority of the user. The user database 103 stores the password in a state of encrypted data or hash value.

As the authority of the user, there are four authorities, and specifically an edit authority for generating the new control program by the editing device 200, a verification authority for verifying an execution of the new control program, an approval authority for approving an operation of the control arithmetic device 100 by the new control program, and a browse authority for browsing the content of the new control program are provided. In this case, in order to prevent the same person from editing and approving, a user having the edit authority should not be given the approval authority and, in similar manner, a user having the approval authority should not be given the edit authority.

In an example illustrated in FIG. 3, a use A only has the browse authority since the user A is an auditor of the control arithmetic device 100. A user B has the approval authority and the browse authority since the user B is the manager of the control arithmetic device 100. A user C has the edit authority, the verification authority, and the browse authority since the user C is the operator or the maintenance engineer of the control arithmetic device 100. A user D has the verification authority and the browse authority but does not have the edit authority since the user D is a checker who checks the edits by the operator or the maintenance engineer.

In FIG. 3, a circle indicates that the user has the corresponding authority (permission of performing) and a cross indicates that the user does not have the corresponding authority (rejection of performing).

Next, an operation of the control program management system according to the present embodiment will be described.

Figure 4:
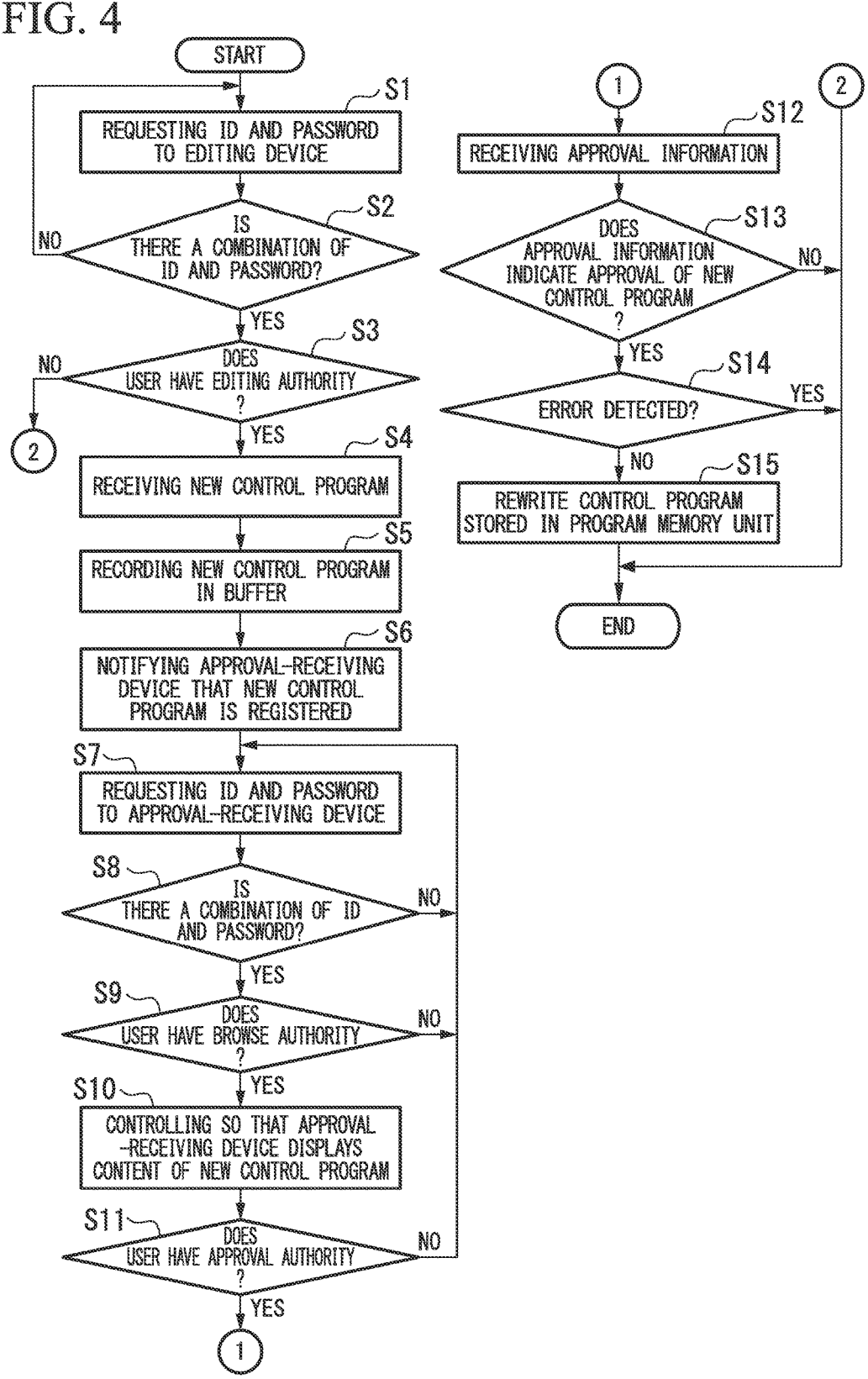
FIG. 4 is a flowchart illustrating an operation of the control arithmetic device according to the first embodiment of the present invention.

FIG. 4 is a flowchart illustrating an operation of the control arithmetic device 100 according to the first embodiment of the present invention.

First, as the operator or the maintenance engineer generates the new control program by operating the editing device 200, the editing device 200 accesses the control arithmetic device 100 in order to transmit the control program to the control arithmetic device 100. As the editing device 200 accesses the control arithmetic device 100, the user I/F unit 104 of the control arithmetic device 100 requests the editing device 200 to send the ID and the password (Step S1). As the user of the editing device 200 inputs the ID and the password to the editing device 200, the editing device 200 transmits the ID and the password to the control arithmetic device 100. At this time, it is preferable that an approval protocol such as PAP (Password Authentication Protocol) and CHAP (Challenge Handshake Authentication Protocol) having improved confidentiality be used for the identification of the user.

As the user I/F unit 104 of the control arithmetic device 100 receives the ID and the password from the editing device 200, the control arithmetic device 100 determines whether the combination of the ID and the password is stored in the user database 103 or not (Step S2). In the case where the combination of the ID and the password is not stored in the user database 103 (Step S2: No), the user I/F unit 104 transmits a notification that the combination of the ID and the password is incorrect to the editing device 200. Returning to Step S1, the user I/F unit 104 stands by the reception of the ID and the password again.

On the other hand, in the case where the combination of the ID and the password is stored in the user database 103 (Step S2: Yes), the user I/F unit 104 determines whether authority stored in the user database 103 and linked to the combination of the ID and the password includes the edit authority or not (Step S3). When the user I/F unit 104 determines that the authority linked to the combination of the ID and the password does not include the edit authority (Step S3: No), the user I/F unit 104 transmits a notification that editing the control program by the user is not permitted to the editing device 200 and finish this process without changing the control program.

On the other hand, when the user I/F unit 104 determines that the authority linked to the combination of the ID and the password includes the edit authority (Step S3: Yes), the user I/F unit 104 receives the new control program from the editing device 200 (Step S4). At this time, the editing device 200 transmits, to the control arithmetic device 100, a CRC (Cyclic Redundancy Check) code (a first error detection code) generated using the new control program and a CRC code (a second error detection code) generated using bit-inverted information of the new control program being attached to the new control program. When the authentication is completed in the step S3, the user I/F unit 104 establishes a session between the user I/F unit 104 and the editing device 200 and permits the communication for a period of time without the authentications in the Steps S1 to S3.

When the user I/F unit 104 receives the new control program from the editing device 200, the temporary recording unit 105 records the new control program in the buffer 106 (Step S5). At this time, the temporary recording unit 105 records the new control program without removing two CRC codes attached to the new control program.

Next, the presentation unit 107 notifies the approval-receiving device 300 that the received new control program is registered (Step S6).

When the approval-receiving device 300 receives the notification that the new control program is registered, the approval-receiving device 300 accesses the control arithmetic device 100 in order to browse the content of the new control program by the operation of the manager. As the approval-receiving device 300 accesses the control arithmetic device 100, the user I/F unit 104 of the control arithmetic device 100 requests the approval-receiving device 300 to transmit the ID and the password (Step S7). As the user of the approval-receiving device 300 inputs the ID and the password to the control arithmetic device 100, the approval-receiving device 300 transmits the ID and the password to the control arithmetic device 100.

As the user I/F unit 104 of the control arithmetic device 100 receives the ID and the password from the approval-receiving device 300, the user I/F unit 104 determines whether the combination of the ID and the password is stored in the user database 103 or not (Step S8). In the case where the combination of the received ID and password is not stored in the user database 103 (Step S8: No), the user I/F unit 104 transmits a notification that the combination of the ID and the password is incorrect to the approval-receiving device 300 and stands by for the reception of the ID and the password again.

On the other hand, in the case where the combination of the ID and the password is stored in the user database 103 (Step S8: Yes), the user I/F unit 104 determines whether the authority stored in the user database 103 and linked to the combination of the ID and the password includes the browse authority or not (Step S9). When the user I/F unit 104 determines that the authority linked to the combination of the ID and the password does not include the browse authority (Step S9: No), the user I/F unit 104 transmits, to the approval-receiving device 300, a notification that a browse of the content of the control program by the user is not permitted. Returning to Step S7, the user I/F unit 104 stands by for access of a user having the browse authority.

On the other hand, when the user I/F unit 104 determines that the authority linked to the combination of the ID and the password includes the browse authority (Step S9: Yes), the user I/F unit 104 transmits information indicating the content of the new control program to the approval-receiving device 300 and controls so that the approval-receiving device 300 displays the information (Step S10). Specifically, the presentation unit 107 simulates the new control program and transmits information including the result of the simulation to the approval-receiving device 300. When the authentication is completed in Step S9, the user I/F unit 104 establishes a session between the user I/F unit 104 and the approval-receiving device 300 and permits the communication for a period of time without the authentications in the Steps S7 to S9.

As the approval-receiving device 300 displays the information including the content of the new control program received from the control arithmetic device 100, the approval-receiving device 300 receives an input indicating whether the content of the new control program is approved or not from the manager. Next, the approval-receiving device 300 transmits the approval information received from the manager to the control arithmetic device 100.

The user I/F unit 104 of the control arithmetic device 100 determines whether the authority stored in the user database 103 and linked to the combination of the ID and the password includes the approval authority or not (Step S11). When the user I/F unit 104 determines that the authority linked to the combination of the ID and the password does not include the approval authority (Step S11: No), the user I/F unit 104 does not receive the approval information from the approval-receiving device 300 and transmits a notification of lack of the approval authority. The user I/F unit 104 terminates the communication with the approval-receiving device 300, returns to the Step S7, and stands by for access of another user from the approval-receiving device 300.

On the other hand, when the user I/F unit 104 determines that the authority linked to the combination of the ID and the password includes the approval authority (Step S11: Yes), the approval information-receiving unit 108 receives the approval information transmitted from the approval-receiving device 300 (Step S12). Next, the program-changing unit 109 determines whether the received approved information indicates the approval of changing to the new control program or not (Step 13).

In the case where the received approval information indicates the approval of changing to the new control program (Step S13: Yes), the program-changing unit 109 reads out the new control program, the first CRC code from the buffer 106, and the second CRC code, and detects an error of the new control program using the first CRC code and the second CRC code (Step S14).

In the case where the error of the new control program is not detected using either of the first CRC code and the second CRC code (Step S14: No), the program-changing unit 109 confirms that disconnection does not exist in a control logic and a compilation error does not occur, and rewrites the control program stored in the program memory unit 101 to the new control program (Step S15).

On the other hand, in the case where the received approval information in the Step S13 indicates that changing to the new control program is not approved (Step S13: No) or in the case where the error of the new control program is detected in the Step 14 (Step S14: Yes), the control program is not changed and this process is finished.

It is preferable that the control arithmetic device 100 records, as logs, the verification results of whether the user who generated the new control program has the edit authority or not (Step S3), the user who input the approval information has the approval authority or not (Step S11), the error is detected by the CRC codes or not (Step S14), the disconnection exists in the control logic or not, and the compilation error occurs or not.

In this manner, according to the present embodiment, the control arithmetic device 100 controls that the approval-receiving device 300 displays the content of the new control program received from the editing device 200. In the case where the approval information received from the approval-receiving device 300 indicates that the new control program is approved, the control arithmetic device 100 rewrites the control program stored in the program memory unit 101 to the new control program. By doing this, the control program management system can prevent the content of the control program executed by the control arithmetic device 100 from being changed to the control parameter or the logic that includes the error.

Further, according to the present embodiment, the control arithmetic device 100 changes the control program in the case where the authority linked to the combination of the ID and the password received from the editing device 200 is the authority for editing the control program and the authority linked to the combination of the ID and the password received from the approval device 300 is the authority for approving the control program. Accordingly, the control program management system can change the control program through the check by the third person other than the operator and the maintenance engineer.

Still further, according to the present embodiment, the control arithmetic device 100 changes the control program in the case where the error is not detected by the first CRC code and the second CRC code attached to the new control program which is received from the editing device 200. In the case where the new control program is changed without authorization, if the error cannot be detected using the first CRC code accidentally, the possibility that the error is detected by the error detection using the second CRC code based on the information of the bit-inverted control program is high. Therefore, according to the present embodiment, the unauthorized changing can be accurately detected even when the new control program transmitted from the editing device 200 is changed without authorization.

[Second Embodiment]

Next, a second embodiment of the present invention will be described.

Figure 5:
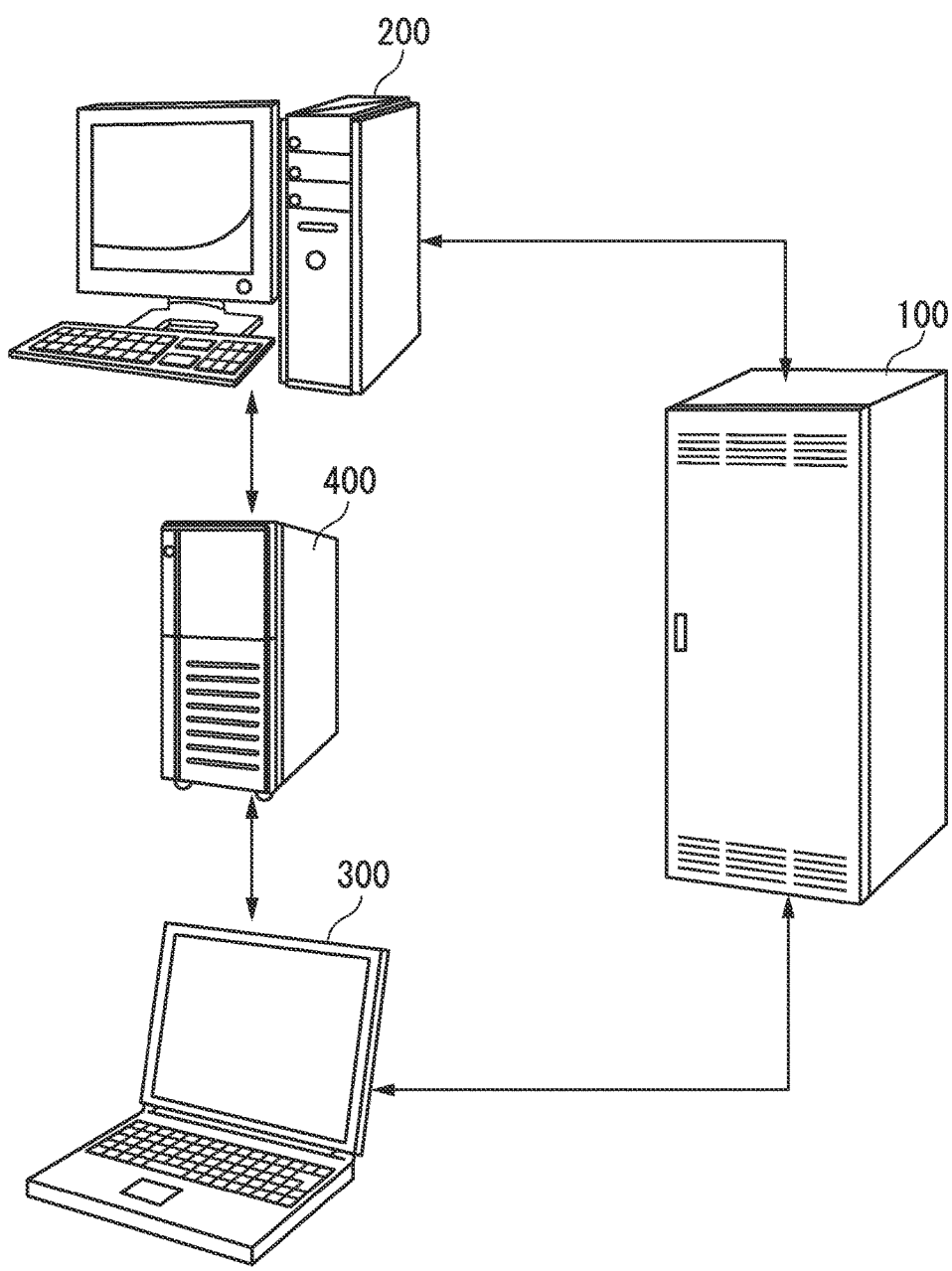
FIG. 5 is a diagram illustrating a configuration of a control program management system according to a second embodiment of the present invention.

FIG. 5 is a diagram illustrating a configuration of a control program management system according to the second embodiment of the present invention.

The control program management system according to the second embodiment includes a design and maintenance device 400 (a program repository device) in addition to the configuration according to the first embodiment.

The design and maintenance device 400 records and manages the control program being executed now by the control arithmetic device 100 and the successive control programs which were executed before in the state where the control programs are linked to their version information.

Figure 6:
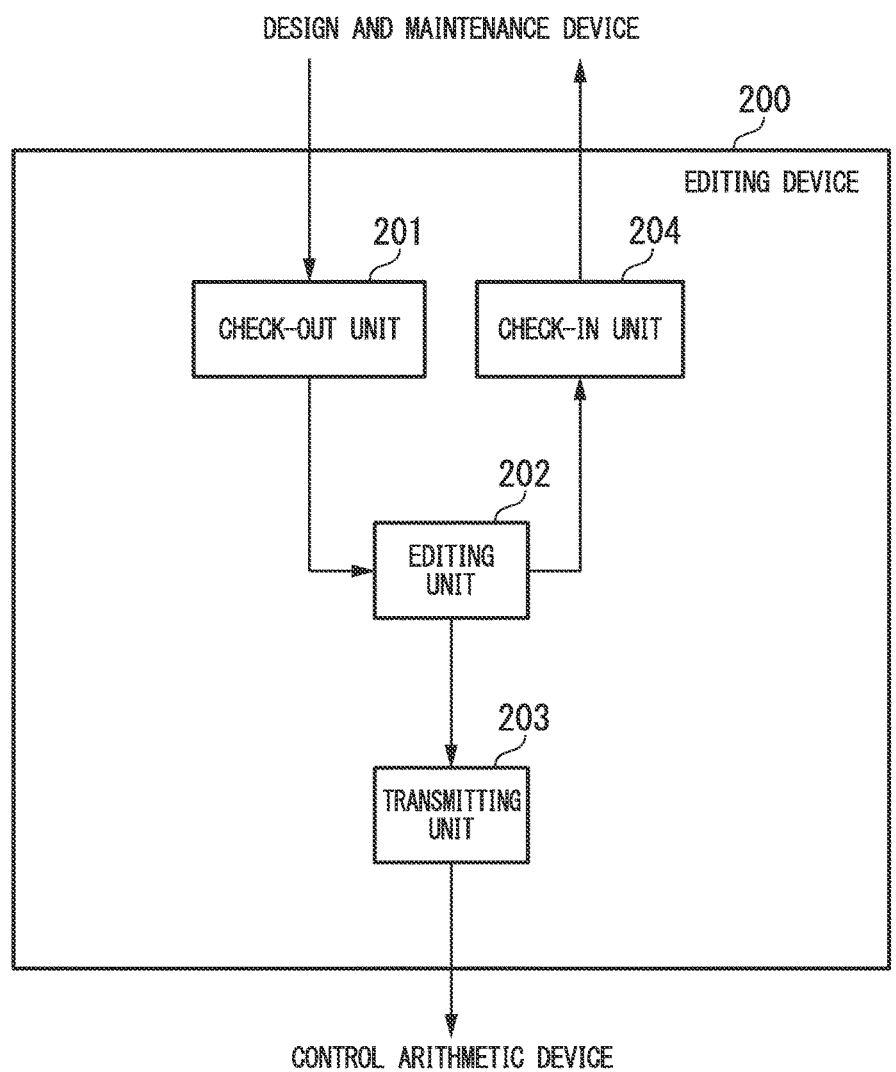
FIG. 6 is a schematic block diagram illustrating a configuration of an editing device according to the second embodiment of the present invention.

FIG. 6 is a schematic block diagram illustrating a configuration of an editing device 200 according to the second embodiment of the present invention.

The editing device 200 includes a check-out unit 201, an editing unit 202, transmitting unit 203, and a check-in unit 204.

The check-out unit 201 checks out the control program being executed now by the control arithmetic device 100 from the design and maintenance device 400 and locks the control program so that the control program cannot be edited. "Checking out" means extracting data from the repository and storing it locally.

The editing unit 202 generates the new control program by editing the control program checked out by the check-out unit 201.

The transmitting unit 203 transmits the new control program generated by the editing unit 202 to the control arithmetic device 100.

The check-in unit 204 checks in the new control program at the design and maintenance device 400 and unlocks the control program. "Checking in" means writing a file to the repository.

Hereinafter, an operation in which the editing device 200 according to the second embodiment edits the control program will be described.

As the operator or the maintenance engineer starts an operation of the editing device 200 in order to edit the control program, the check-out unit 201 of the editing device 200 checks out the control program being executed now by the control arithmetic device 100 from the design and maintenance device 400. Then, the check-out unit 201 locks the checked-out control program. Next, according to an operation of the operator or the maintenance engineer, the control program checked out by the editing unit 202 is edited to generate the new control program. As editing is completed, the transmitting unit 203 transmits the new control program to the control arithmetic device 100. The check-in unit 204 unlocks the new control program after checking in the new control program.

At this time, the design and maintenance device 400 determines whether the user of the editing device 200 at the time when the control program was locked and the user of the editing device 200 at the time when the control program was unlocked are the same or not. This can be performed by obtaining the IDs of the users while the design and maintenance device 400 is communicating with the editing device 200 and determining whether the IDs are the same or not. In the case where the user at the time of the lock is different from the user at the time of the unlock, the design and maintenance device 400 transmits, to the approval-receiving device 300, a notification that the user at the time of the lock is different from the user at the time of the unlock. Accordingly, by visually recognizing the notification, the user having the approval authority can be informed that the control program is not properly edited.

Next, an operation of the approval-receiving device 300 will be described.

According to the second embodiment, the presentation unit 107 of the control arithmetic device 100 transmits the version information of the control program being executed now by the program-executing unit 102 and the version information of the control program stored in the buffer 106 to the approval-receiving device 300 in the Step S10 described above. The approval-receiving device 300 reads out the control program linked to two received version information from the design and maintenance device 400. At this time, the approval-receiving device 300 may search a specification of changes from the design and maintenance device 400 and transmit the specification to the change authentication device. Then, the approval-receiving device 300 generates a difference between the new control program and the program being performed now and displays the information of the difference.

For example, the approval-receiving device 300 can emphatically display the difference by displaying the changed portion (the difference) of the new control program with red and the unchanged portion of it with black.

Namely, the presentation unit 107 of the present embodiment controls so that the difference between the new control program and the control program being executed now is displayed by the approval-receiving device 300.

In this manner, according to the present embodiment, the approval-receiving device 300 emphatically displays the portion different from the control program being executed now. By doing this, the possibility that the manager misses the error portion of the parameter or logic to be changed in the control program can be reduced.

The approval-receiving device 300 notifies the version information of the changed control program to the design and maintenance device 400 when the control arithmetic device 100 finished the change of the control program. The design and maintenance device 400 links the new control program to the version information, and records and manages the new control program.

In the present embodiment, an example in which the design and maintenance device 400 is provided as an external device was described. However, the design and maintenance device 400 is not limited thereto. The design and maintenance device 400 may be installed in the control arithmetic device 100. In this case, the presentation unit 107 generates the information of the difference between the control programs instead of the approval-receiving device 300 and the approval-receiving device 300 displays the information of the difference.

Further, according to the present embodiment, the presentation unit 107 may control so that the approval-receiving device 300 displays each difference between the new control program and control programs which are plural generations older than the new control program stored in the design and maintenance device 400 in addition to the difference between the new control program and the control program being executed now. By doing this, the new control program can be prevented from reverting to logics of the control programs which are plural generations older than the new program.

[Third Embodiment]

According to the second embodiment, the example in which after the editing device 200 checks in and unlocks the control program of the design and maintenance device 400, the approval process is performed by the approval-receiving device 300 was described. According to a third embodiment, after the approval-receiving device 300 receives the approval information from the manager, the control program stored in the design and maintenance device 400 is checked in and unlocked.

Figure 7:
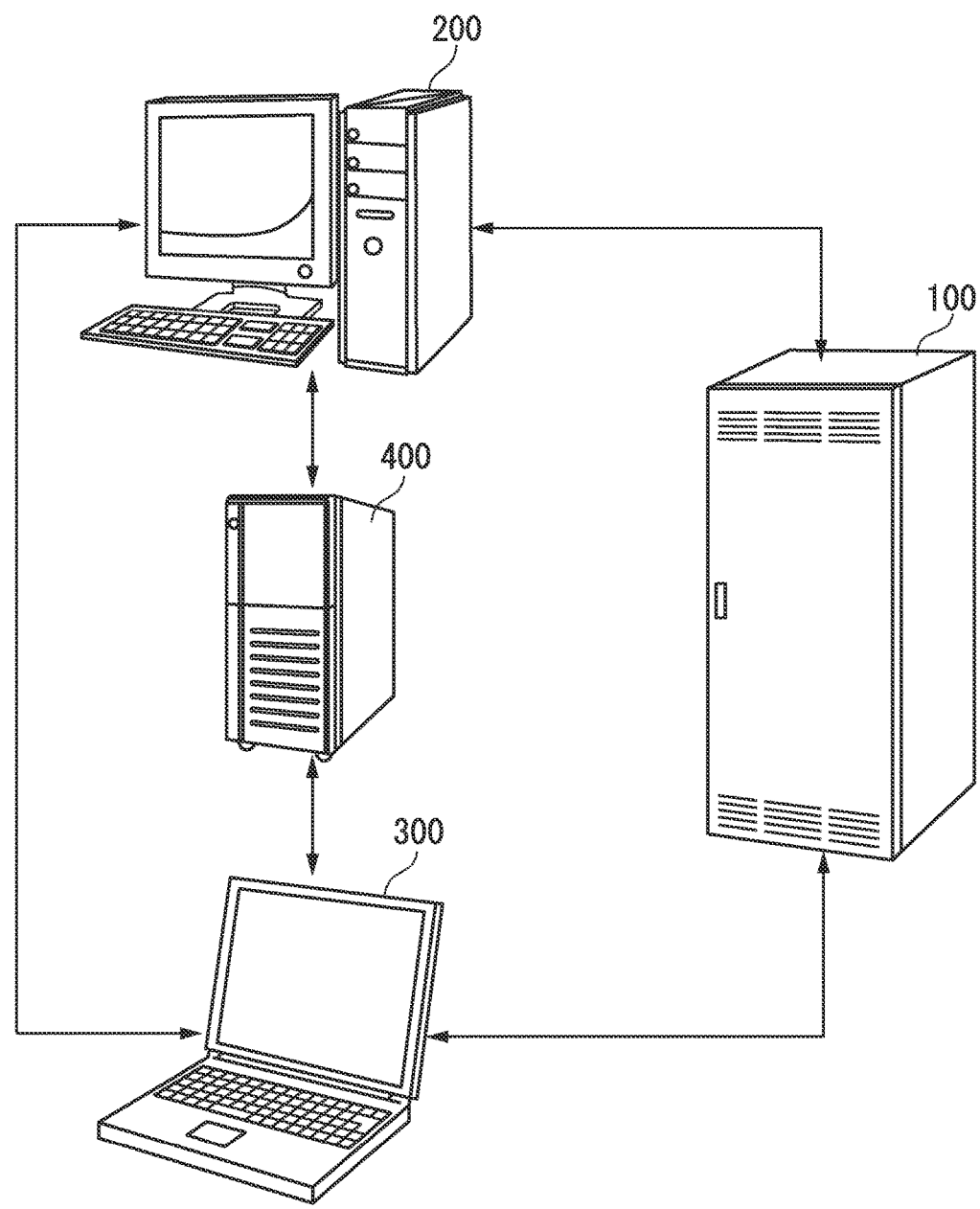
FIG. 7 is a diagram illustrating a configuration of a control program management system according to a third embodiment of the present invention.

FIG. 7 is a diagram illustrating a configuration of a control program management system according to the third embodiment of the present invention.

As shown in FIG. 7, according to the third embodiment, the approval-receiving device 300 communicates with an editing device 200.

A check-in unit 204 of the editing device 200 according to the third embodiment is different from that of the second embodiment, and does not check in and unlock the new control program when an editing unit 202 completes the edit. A transmitting unit 203 of the editing device 200 according to the third embodiment is different from that of the second embodiment, and transmits the new control program to the control arithmetic device 100 and the approval-receiving device 300 when the editing unit 202 completes the edit.

On the other hand, as the approval-receiving device 300 displays the generation of the difference between the new control program and the control program being executed now and receives the input of the approval information, the approval-receiving device 300 transmits the approval information to the control arithmetic device 100 and the editing device 200. Then, the check-in unit 204 of the editing device 200 checks in and unlocks the new control program received from the editing device 200 when the approval information indicates the approval of changing. The check-in unit 204 of the editing device 200 does not check in the control program and unlocks it when the approval information indicates the rejection of changing.

In the present embodiment similar to the second embodiment, the design and maintenance device 400 may be installed in the control arithmetic device 100. Also, the approval-receiving device 300 may display each difference between the new control program and the control programs which are plural generations older than the new control program.

[Fourth Embodiment]

According to the third embodiment, an example in which after the approval-receiving device 300 received the approval information from the manager, the editing device 200 unlocks the control program was described. According to a fourth embodiment, the editing device 200 locks the control program and the approval-receiving device 300 unlocks when the approval-receiving device 300 receives the approval information from the manager.

An editing device 200 according to the fourth embodiment, similar to the third embodiment, does not check in and unlock the new control program when an editing unit 202 completes editing. The editing device 200 transmits the new control program to the control arithmetic device 100 and the approval-receiving device 300.

On the other hand, as the approval-receiving device 300 receives the input of the approval information from the user, the approval-receiving device 300 determines whether the approval information indicates that the change to the new control program is approved or not. When the approval information indicates the approval of changing, the approval-receiving device 300 checks in the new control program received form the editing device 200 at the design and maintenance device 400 and unlocks the control program. On the other hand, when the approval information indicates the rejection of changing, the approval-receiving device 300 does not check in the new control program and unlocks the control program.

In this manner, according to the present embodiment, the control program which is not approved is prevented from being recorded in the design and maintenance device 400. Also, since the control program in the design and maintenance device 400 is locked until the approval is received, it can be prevented that a control program of a version is applied to the different design changes at the same time. Further, since the approval-receiving device 300 unlocks instead of the editing device 200, the new control program can be checked in the design and maintenance device 400 and unlocked immediately after the approval information is received.

In the present embodiment similar to the second and third embodiments, the design and maintenance device 400 may be installed in the control arithmetic device 100. Also, the approval-receiving device 300 may display each difference between the new control program and the control programs which are plural generations older than the new control program.

[Fifth Embodiment]

Figure 8:
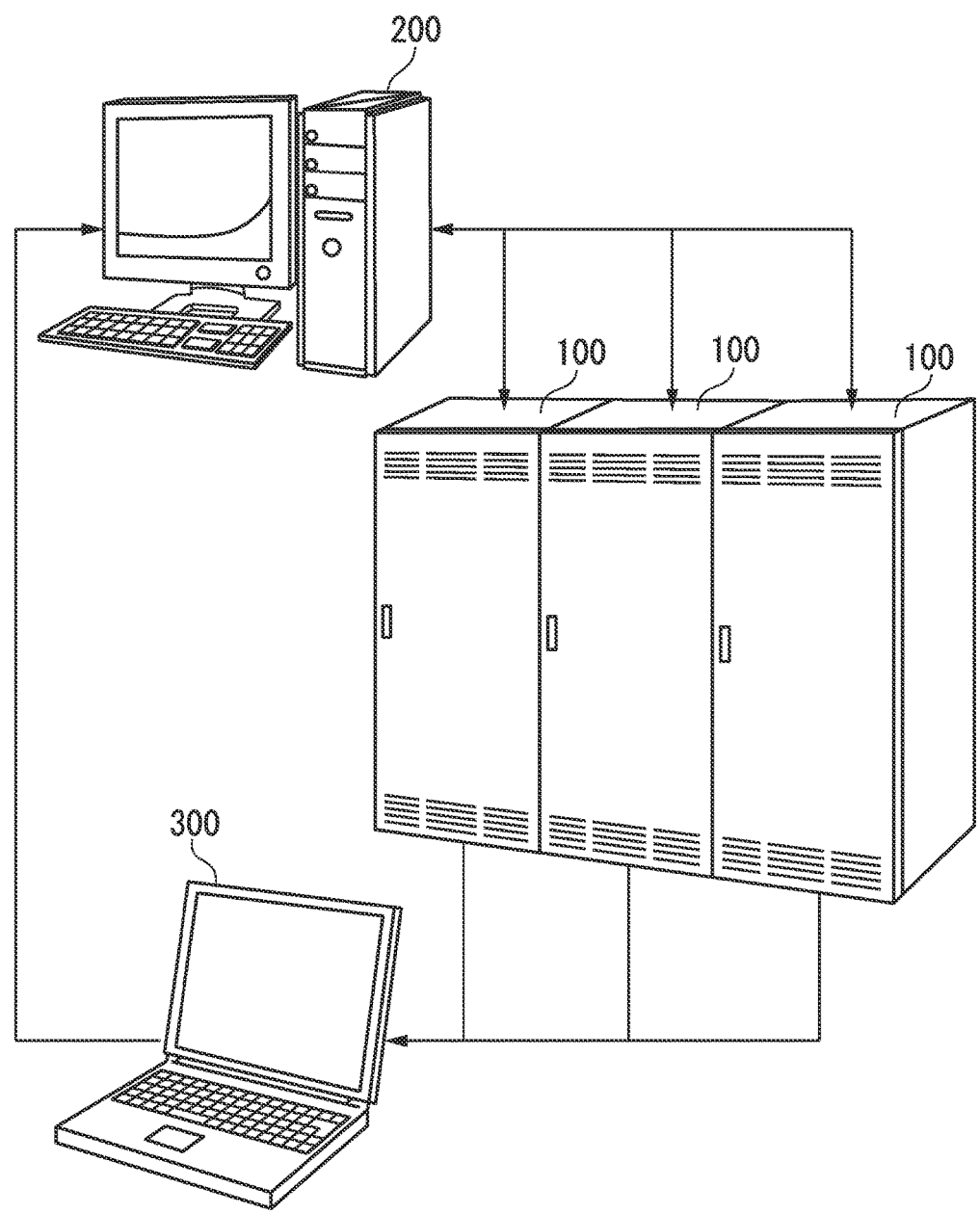
FIG. 8 is a diagram illustrating a configuration of a control program management system according to a fifth embodiment of the present invention.

FIG. 8 is a diagram illustrating a configuration of a control program management system according to a fifth embodiment of the present invention.

According to the first through fourth embodiments, the case where the control program is changed in one control arithmetic device 100 is explained. However, practically, there are many cases in which the plant is operated using the plurality of the control arithmetic devices 100 for redundancy and load balancing. This is because a reducing load of the control arithmetic device 100 in order to operate many control logics or applying a low price CPU (Central Processing Unit) is demanded. Therefore, when the control program is changed by the control program management system according to the first through fourth embodiments, the manager needs to input the approval information for each redundant editing device 200. According to the fifth embodiment, a method for changing the control programs of the plurality of the control arithmetic devices 100 will be described.

The editing device 200 has a function of selecting the control arithmetic devices 100 to be applied to the new control program. The editing device 200 transmits the generated new control program to all the control arithmetic devices 100 which are selected by the function. On the other hand, the approval-receiving device 300 displays the content of the new control program received from the plurality of the control arithmetic devices 100 and the approval-receiving device 300 transmits the approval information inclusively indicating the approval or rejection of changes for all the control arithmetic devices 100.

The editing device 200 transmits the approval information received from the approval-receiving device 300 to the control arithmetic device 100. Then, the approval information-receiving unit 108 of the control arithmetic device 100 receives the approval information from the editing device 200. The program-changing unit 109 determines the approval or rejection of changing the control program based on the approval information. Since the control arithmetic devices 100 having a redundant structure synchronize each process timing, all the processes of the control arithmetic device 100 are started when a synchronization with the control program recorded in the program memory is done.

In this manner, according to the present embodiment, the control program can be changed in the plurality of control arithmetic devices 100 at the same time. By doing this, the burden on a user in changing the control program can be reduced.

The embodiments of the present invention have been explained in detail above with reference to the drawings. However, a specific configuration is not limited to the above-described configurations and various design changes or the like may be made without departing from the spirit of the present invention.

The control arithmetic device 100, the editing device 200, and the approval-receiving device 300 described above include a computer system therein. And, the operations in the individual processing units described above are stored at a computer-readable recording medium in the format of a program. The computer reads and carries out the program to execute the above processing. In this case, the computer-readable recording media include a magnetic disc, a magneto-optical disk, a CD-ROM, a DVD-ROM and a semiconductor memory. It is acceptable that this computer program be distributed to a computer via a communication line and the program be carried out by using the computer to which the program has been distributed.

Further, the program may be such that it partially realizes the previously described functions.

Still further, there may also be acceptable a so-called difference file (difference program) which is able to realize the previously described functions in combination with a program which has already been recorded in a computer system.

INDUSTRIAL APPLICABILITY

The content of a control program can be prevented from being changed to a control parameter and logic having an error.

DESCRIPTION OF REFERENCE NUMERALS

100 . . . control arithmetic device, 101 . . . program memory unit, 102 . . . program-executing unit, 103 . . . user database, 104 . . . user I/F unit, 105 . . . temporary recording unit, 106 . . . buffer, 107 . . . presentation unit, 108 . . . approval information-receiving unit, 109 . . . program-changing unit, 110 . . . field I/F unit, 200 . . . the editing device, 201 . . . the check-out unit, 202 . . . editing unit, 203 . . . transmitting unit, 204 . . . check-in unit, 300 . . . approval-receiving device, 400 . . . design and maintenance device

The invention claimed is:

1. A control program management system comprising:
a control arithmetic device;
an editing device that generates a new control program to be executed by the control arithmetic device instead of a control program being executed by the control arithmetic device based on operation of a first user and transmits the new control program together with first identification information and first authentication information of the first user to the control arithmetic device; and
an approval-receiving device that receives an input of approval information which is input by a second user and indicates whether the new control program generated by the editing device is to be executed by the control arithmetic device or not and transmits the approval information together with second identification information and second authentication information of the second user to the control arithmetic device, the second identification information and the second authentication information of the second user are different from the first identification information and the first authentication information of the first user,
wherein the control program management system manages the change of the control program executed by the control arithmetic device,
wherein the control arithmetic device comprises:
a program memory unit that stores the control program to be executed;
a program execution unit that executes the control program stored in the program memory unit;
a temporary recording unit that receives the new control program from the editing device and records the control program in a buffer when authentication using the first identification information and the first authentication information of the first user succeeds, and blocks the new control program when the authentication using identification information and authentication information other than the first identification information and the first authentication information of the first user fails;
a presentation unit that controls so that the approval-receiving device displays a content of the control program recorded in the buffer;
an approval information-receiving unit that receives the approval information from the approval-receiving device when authentication using the second identification information and the second authentication information of the second user succeeds, and blocks the approval information when the authentication using identification information and authentication information other than the second identification information and the second authentication information of the second user fails; and
a program-changing unit that rewrites the control program stored in the program memory unit to the control program recorded in the buffer when the approval information received by the approval information-receiving unit indicates approval of the control program.

2. The control program management system according to claim 1, further comprising:
a user database that links and stores identification information that identifies a user, the authentication information used for authentication of the identification information, and authority of the user for each user,
wherein the program-changing unit of the control arithmetic device rewrites the control program stored in the program memory unit to the control program stored in the buffer when the approval information received by the approval information-receiving unit indicates the approval of the control program in the case where the authority that is linked to the identification first information and the first authentication information received from the editing device and is stored in the user database is authority allowed to edit the control program and the authority that is linked to the second identification information and the second authentication information received from the approval-receiving device and is stored in the user database is authority allowed to approve the control program.

3. The control program management system according to claim 1, wherein the editing device transmits, to the control arithmetic device, a first error detection code generated using the new control program and a second error detection code generated using bit-inverted information of the new control program together with the new control program, and
wherein the program-changing unit of the control arithmetic device rewrites the control program stored in the program memory unit to the control program stored in the buffer when the approval information received by the approval information-receiving unit indicates the approval of the control program in the case where an error is not detected by using the first error detection code and the second error detection code received from the editing device together with the control program.

4. The control program management system according to claim 1, wherein the presentation unit of the control arithmetic device simulates an execution of the control program stored in the buffer and control so that the approval-receiving device displays the result of the simulation.

5. The control program management system according to claim 1, wherein the presentation unit of the control arithmetic device controls so that the approval-receiving device displays a difference between the control program being executed by the program-executing unit and the control program stored in the buffer.

6. The control program management system according to claim 5, further comprising:
a program repository device that stores each control program that was stored in the program memory unit before,
wherein the presentation unit of the control arithmetic device controls so that the approval-receiving device displays a difference between each control program stored in the program repository device and the control program stored in the buffer.

7. The control program management system according to claim 6, wherein the editing device comprises:
a check-out unit that checks out the control program being executed by the program-executing unit from the program repository device and locks it so that the control program cannot be edited;
an editing unit that generates the new control program by editing the checked-out control program;
a transmitting unit that transmits the new control program generated by the editing unit to the control arithmetic device; and
a check-in unit that unlocks the checked-out control program and checks in the new control program to the program repository device,
wherein the program repository device determines whether a user who locks the control program is the same as a user who unlocks or not and notifies the determination result to a user who has approval authority when the user who locks the control program is not the same as the user who unlocks.

8. The control program management system according to claim 6, wherein the editing device comprises:
a check-out unit that checks out the control program being executed by the program-executing unit from the program repository device and locks so that the control program cannot be edited;
an editing unit that generates the new control program by editing the checked-out control program; and
a transmitting unit that transmits the new control program generated by the editing unit to the control arithmetic device,
wherein the lock of the control program stored in the program repository device is unlocked after the approval-receiving device receives the approval information.

9. The control program management system according to claim 8, wherein the approval-receiving device unlocks the control program stored in the program repository device in the case of receiving the approval information.

10. The control program management system according to claim 8, wherein the approval-receiving device transmits a notification to the editing device when the approval-receiving device receives the approval information, and
wherein the editing device unlocks the control program stored in the program repository device when the editing device receives the notification from the approval-receiving device.

11. The control program management system according to claim 1, wherein the control arithmetic device has a plurality of the control arithmetic devices which execute the same control program due to its redundancy,
wherein the approval-receiving device transmits the approval information to the editing device instead of the control arithmetic device,
wherein the editing device transmits the new control program to all the control arithmetic devices to which the new control program is applied and transfers the approval information received from the approval-receiving device to the control arithmetic device,
wherein the approval information-receiving unit of the control arithmetic device receives the approval information from the editing device instead of the approval-receiving device.

12. A method of changing a control program executed by a control arithmetic device, the method comprising:
generating, by an editing device, a new control program to be executed by the control arithmetic device instead of a control program being executed by the control arithmetic device based on operation of a first user and transmitting the new control program together with first identification information and first authentication information of the first user to the control arithmetic device;
receiving the new control program from the editing device by a temporary recording unit of the control arithmetic device and recording the control program in a buffer when authentication using the first identification information and the first authentication information of the first user succeeds, and blocking the new control program when the authentication using identification information and authentication information other than the first identification information and the first authentication information of the first user fails;
displaying a content of the control program recorded in the buffer on an approval-receiving device by a presentation unit of the control arithmetic device;
receiving, by the approval-receiving device, an approval information that is input by a second user and indicates whether the new control program generated by the editing device is to be executed by the control arithmetic device or not from the approval-receiving device and transmitting the approval information together with second identification information and second authentication information of the second user to the control arithmetic device by the approval-receiving device, the second identification information and the second authentication information of the second user are different from the first identification information and the first authentication information of the first user;
receiving the approval information from the approval-receiving device by an approval information-receiving unit of the control arithmetic device when the authentication using the second identification informnation and the second anthentication information of the second user succeeds, and blocking the approval information when the authentication using identification information and authentication information other than the second identification information and the second authentication information of the second user fails; and
rewriting, by a program-changing unit of the control arithmetic device, the control program stored in a program memory unit that stores the control program to be performed to the control program recorded in the buffer when the approval information received by the approval information-receiving unit indicates approval of the control program.

* * * * *